United States Patent [19]

Feng et al.

[11] Patent Number: 5,704,859
[45] Date of Patent: Jan. 6, 1998

[54] TYPE OF THE COMPACT FREEWHEEL BODY FOR BICYCLES

[75] Inventors: Chen-Hua Feng, Chia Yi Hsien; Ching Huan Tseng; Shyh-Haur Su, both of Hsin Chu, all of Taiwan

[73] Assignee: National Science Council of Republic of China, Taipei, Taiwan

[21] Appl. No.: 733,106

[22] Filed: Oct. 16, 1996

[51] Int. Cl.[6] .......................................... F16H 9/08
[52] U.S. Cl. .......................... 474/78; 474/160; 474/903
[58] Field of Search ........................... 474/77, 78, 158, 474/160, 902, 903

[56] References Cited

U.S. PATENT DOCUMENTS

| | | | |
|---|---|---|---|
| 3,648,519 | 3/1972 | Nakata et al. | 474/160 X |
| 3,900,088 | 8/1975 | Ozaki | 474/160 X |
| 3,942,615 | 3/1976 | Craig | 474/160 X |
| 4,121,474 | 10/1978 | Suinaga | 474/160 |
| 5,324,100 | 6/1994 | James | 474/160 X |
| 5,480,357 | 1/1996 | Liang | 474/77 |

*Primary Examiner*—Roger J. Schoeppel
*Attorney, Agent, or Firm*—Bacon & Thomas

[57] ABSTRACT

A new type of the compact freewheel body for bicycle includes a freewheel casing, a ball seat, a hub, two rows of steel balls, an adjusting ring and a clutch located in the hub. The ball ring at the top of a convention freewheel casing is moved to the bottom to become a ball seat. The distance between two rows of steel balls is increased. The freewheel body can be made more compact. Smaller gear seat may be used and thus increasing the speed ratio and improving mechanical strength of the gear set. The wobbling of the freewheel can be effectively reduced to make the freewheel running and gear shifting smoother and more reliable.

2 Claims, 4 Drawing Sheets

TYPE OF THE COMPACT FREEWHEEL BODY FOR BICYCLES

BACKGROUND OF THE INVENTION

1. Field of the Invention

This invention relates to a freewheel structure for a bicycle and particularly to a compact freewheel with a smaller diameter so that a small gear set may be used in a variable speed bicycle.

2. Description of the Prior Art

Variable speed bicycles with shift gears are very popular nowadays. To change gears smoothly and reliably is one of the common requirements for this type of bicycle. A freewheel device is a key component to attain this end. However, it often happens that the freewheel will wobble or vibrate sideward during gear shift operation. This is mainly caused by the design problem of the freewheel and the loose tolerances of the freewheel components. FIGS. 1 and 2 illustrate the structure of a conventional freewheel for a bicycle. It includes a freewheel casing 13, a hub 16, a bearing ring 11, two rows of steel balls 12 and 14 arranged respectively in an annular form, a one-way clutch 15 and an adjusting ring 17. Such structure has some disadvantages, notably:

1. Because of the bearing ring 11, the diameter of the squelch circumference 131 of the casing 13 has a relatively large diameter. The size of a gear set cannot be reduced to optimal level. It also limits the speed ratio of the gear set. The center opening of the gear set also has to be relatively large to accommodate the freewheel. This results in a narrow root section of the gear set and reduces the loading capability of the smaller gears. It therefore tends to cause a teeth-jumping phenomenon.
2. The distance between the steel balls 12 and 14 is relatively short. The freewheel is thus more sensitive to the components tolerance and is prone to wobble.
3. The steel ball track 163 in the hub 16 and ball track 111 in the bearing ring 11 are fabricated separately. They are difficult to align parallel during assembly and become one of the causes of freewheel wobbling.
4. The assembly of the steel balls 12 and 14 needs a special tool. The steel balls 12 are close to the clutch 15. When lubricating the steel balls 12, the lubricating oil is prone to smear the clutch 15 making it malfunction.
5. The adjusting ring 17 has a relatively small diameter and could cause the bearing ring 11 to loosen.
6. The bearing ring could become loose.
7. The whole structure is not sufficiently shielded. It tends to collect dust and dirt, and impair its operation.

SUMMARY OF THE INVENTION

In view of the aforesaid disadvantages, it is an object of this invention to provide an improvement on the freewheel body for a bicycle to alleviate the problems of the conventional freewheel. In this invention, the bearing ring is located at the bottom of the freewheel. The diameter of the freewheel casing can be made smaller to allow a smaller gear set to be used.

The interval between two rows of steel balls is increased, and the adjusting ring is enlarged. Through these changes, the freewheel becomes more compact. The wobbling can also be reduced as fabrication and assembly can be more precisely controlled. Upon adopting the present invention, the teeth number of the smallest gear may be down to 11 or 12. It thus can reduce the size of the freewheel.

Additional advantages of the present invention will be made apparent in the following description having reference to the accompanying drawings. The drawings are only to serve for reference and illustrative purposes, and do not limit the scope of the present invention.

DETAILED DESCRIPTION OF THE PREFERRED EMBODIMENT

Figure 1:
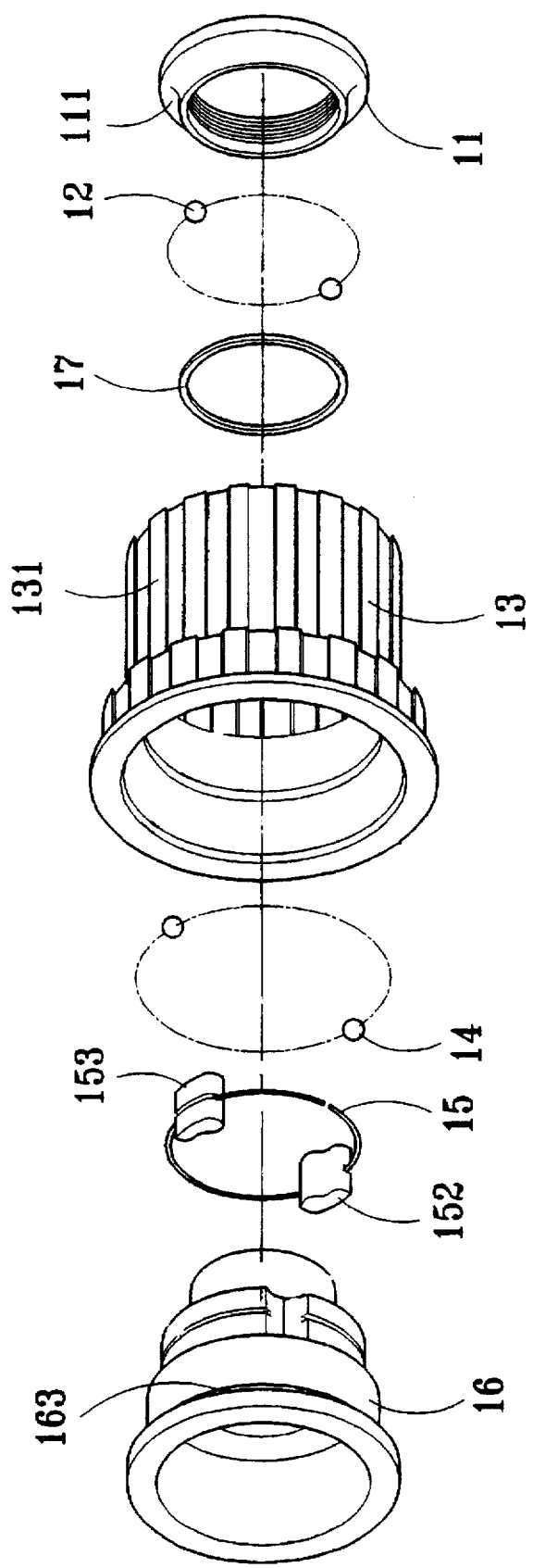
FIG. 1 is an exploded view of a conventional freewheel body.
Figure 2:
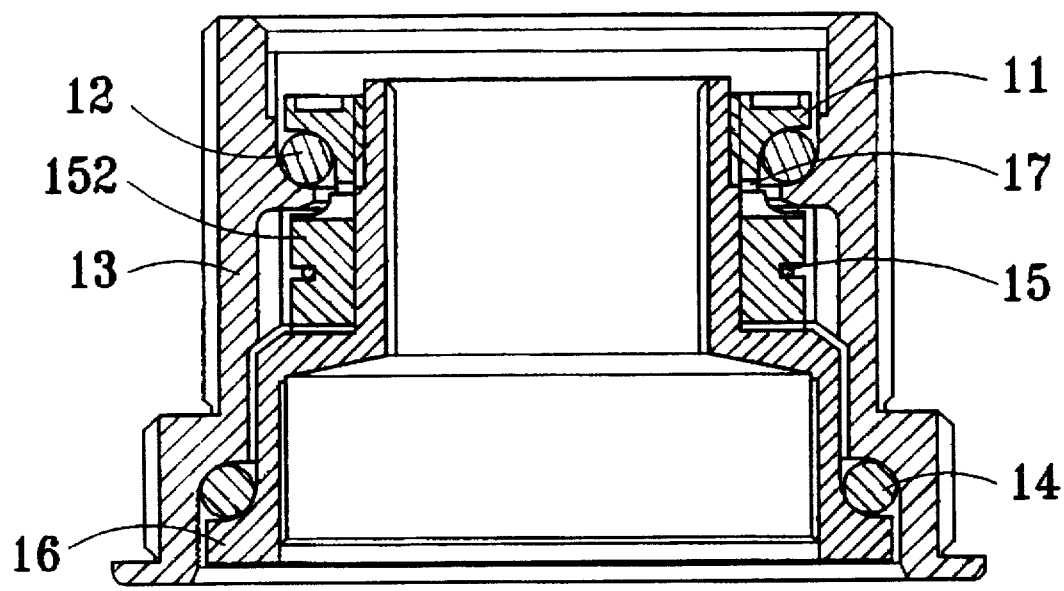
FIG. 2 is a sectional view of a conventional freewheel body.

FIGS. 1 and 2 illustrate the structure of a conventional freewheel body. It includes a freewheel casing 13, a hub 16, a bearing ring 11, two rows of steel balls 12 and 14 arranged respectively in an annular from, a one-way clutch 15 having clutch shoes 152 and 153 and an adjusting ring 17.

Figure 3:
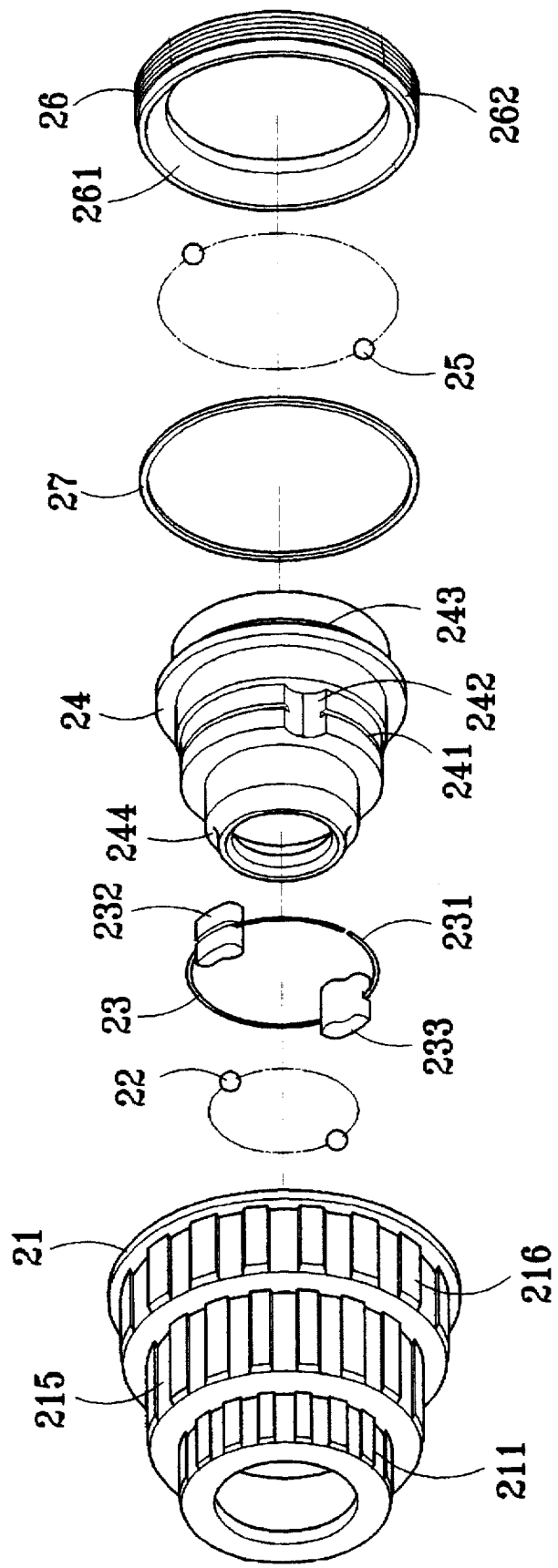
FIG. 3 is an exploded view of the present invention.
Figure 4:
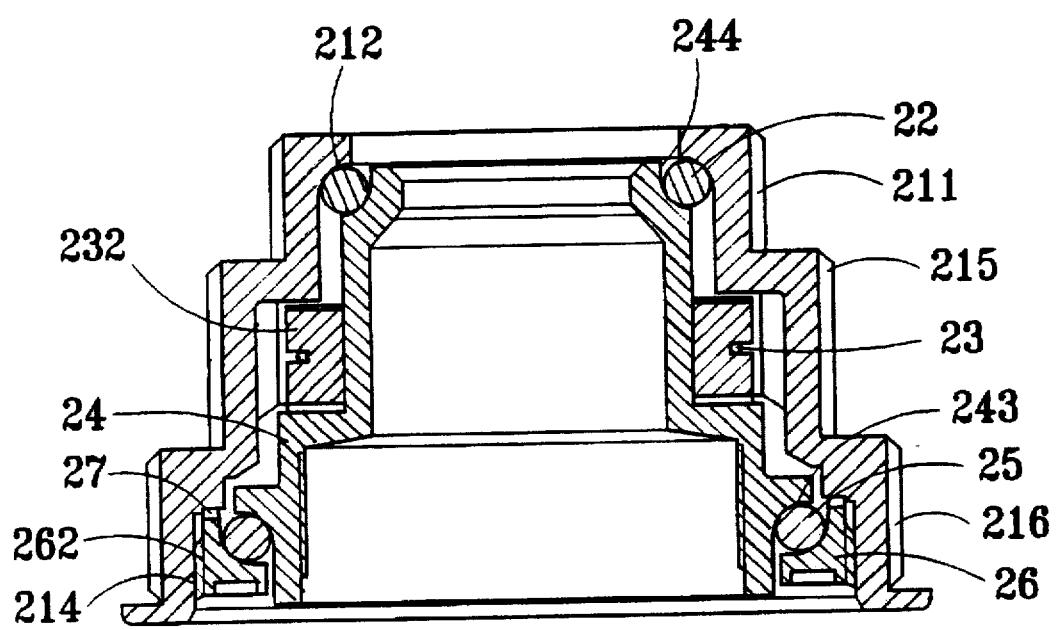
FIG. 4 is a sectional view of the present invention.

Referring to FIGS. 3 and 4, this invention includes a freewheel casing 21, a ball seat 26, a hub 24, a one-way clutch 23 and an adjusting ring 27.

The freewheel casing 21 is in general a hollow tube with stepped section of different diameters.

A top section 211 has the smallest diameter. The middle section 215 has a larger diameter. The bottom section 216 has the largest diameter. All three sections have idented slots axially formed on the peripheral surfaces. Inside the top section 211, there is a first annular ball track 212 for holding the first row of steel balls 22. In the bottom section 216, there is an internal screw thread 214 formed around a bottom opening The ball seat 26 has an external screw thread 262 for engaging with the internal screw thread 214 of the bottom section of the casing 21. The ball seat 26 further has second annular ball track 261 for holding the second row of steel balls 25.

The hub 24 is in general a hollow tube with stepped sections of different diameters housed in the freewheel casing 21 and generally mates with the internal contour of the freewheel casing 21. The hub 24 has a third ball track 243 and a fourth ball track 244 mating respectively with the second ball track 261 and the first ball track 212 for holding respectively the second roll of steel balls 25 and the first row of steel balls 22 therebetween.

The hub 24 further has an annular groove 241 for holding a C-shaped spring 231 therein, and a pair of concave slots 242 for accommodating a pair of clutch shoes 232 and 233 which are held by the C-shaped spring 231. The adjusting ring 27 is located between the free wheel casing 21 and the ball seat 26 for adjusting the tolerance between the second row of steel balls 25 and the ball tracks 261 and 243.

The structure of this invention set forth above has the following advantages:

1. There is no bearing ring on the top of the freewheel. The top section of the freewheel may be made smaller and hold a smaller gear set thereon. Therefore the speed ratio of the gear set may be increased. The distance from the teeth root and the center opening of the gear set may be increased, thus enhancing the mechanical strength. The design of teeth profile can also be more flexible.

2. The distance between the first and second row of steel balls is increased. Therefore the freewheel can be held more steady, thus reducing the wobbling of the freewheel.

3. The ball tracks in the hub may be fabricated and finished by one process. It can be made more precisely and cheaply.

4. The two rows of steel balls are installed of the same direction. The assembly can be done more quickly or automatically. It is also easier for lubrication. The distance between the first row of steel balls and the clutch is increased. The clutch is better protected from smearing by lubricating oil.

5. The diameter of the adjusting ring is larger than the conventional one. It also helps to reduce freewheel wobbling.

6. The ball seat can be more securely held in the freewheel casing without the risk getting loose.

7. This invention is better shielded from ambient environment, and thus can better preventing dust and dirt from entering into the freewheel.

8. There is no increasing of the number of components over the conventional freewheel. The aforesaid benefits can be obtained without additional cost.

Through the improvement set forth above, this invention can make the freewheel more compact. Gear shifting can be done more smoothly and stably without wobbling like a conventional freewheel.

It may thus be seen that the objects of the present invention set forth herein, as well as those made apparent from the foregoing description, are efficiently attained. While the preferred embodiment of the invention has been set forth for purpose of disclosure, modifications of the disclosured embodiment of the invention as well as other embodiments thereof may occur to those skilled in the art. Accordingly, the appended claims are intended to cover all embodiments which do not depart from the spirit and scope of the invention.

What is claimed is:

1. A compact freewheel body for bicycles, comprising:

a hollow tubular freewheel casing with three stepped sections of different diameters and with indented slots formed axially on an outside circumference of each section, including a top section having a first ball track formed therein; a middle section and a bottom section with an internal screw thread formed around a bottom opening thereof;

a ball seat having an external screw thread engageable with the internal screw thread of the freewheel casing and a second ball track formed thereon;

a hollow tubular hub with stepped sections of different diameters and housed within the freewheel casing, the hub including a third ball track for holding a second row of steel balls with the second ball track, and a fourth ball track for holding a first row of steel balls with the first ball track;

a one-way clutch including a C-shaped spring and a pair of spaced clutch shoes located between the freewheel casing and the hub; and an adjusting ring located between the freewheel casing and the ball seat; whereby the hub is freely rotating within the freewheel casing without wobbling axially.

2. The compact freewheel body for bicycles of claim 1, wherein the hub further comprises an annular groove engaging the C-shaped spring of the clutch and a pair of spaced concave slots formed in the outside circumference for holding the clutch shoes of the clutch.

* * * * *